United States Patent [19]

Morioka et al.

[11] Patent Number: 4,783,257
[45] Date of Patent: Nov. 8, 1988

[54] PAINT WASTE SEPARATOR-COLLECTOR APPARATUS

[75] Inventors: Koji Morioka; Makoto Watanabe, both of Tokyo, Japan

[73] Assignee: Taikisha Ltd., Tokyo, Japan

[21] Appl. No.: 120,873

[22] Filed: Nov. 16, 1987

[30] Foreign Application Priority Data

Dec. 10, 1986 [JP] Japan ................ 61-294545

[51] Int. Cl.⁴ ............................................. C02F 1/24
[52] U.S. Cl. ................................. 210/109; 210/110; 210/167; 210/196; 210/258; 55/DIG. 46
[58] Field of Search ............... 55/DIG. 46; 210/97, 210/86, 104, 109, 110, 167, 197, 196, 295, 255, 525, 258; 137/571, 574

[56] References Cited

U.S. PATENT DOCUMENTS

| | | | |
|---|---|---|---|
| 3,173,879 | 3/1965 | Arnold et al. | 55/DIG. 46 |
| 3,764,013 | 10/1973 | Eisenmann | 210/705 |
| 3,772,190 | 11/1973 | Eisenman | 210/255 |
| 4,100,066 | 7/1978 | Bloomer et al. | 210/112 |
| 4,470,905 | 9/1984 | Pangburn et al. | 210/523 |
| 4,585,557 | 4/1986 | Turnquist | 210/525 |
| 4,722,791 | 2/1988 | Turnquist | 210/525 |

*Primary Examiner*—Peter Hruskoci
*Attorney, Agent, or Firm*—Webb, Burden, Ziesenheim & Webb

[57] ABSTRACT

A paint waste separator-collector apparatus having a separator tank for receiving water containing paint waste and for causing the contained paint waste to separate and float, a weir for causing the floating paint waste together with overflowing water from the separator tank into a collector container and a water level adjusting mechanism for switchably providing a paint waste accumulating condition in which a water level in the separator tank is lowered for the water not to flow over the weir thereby causing the floating paint waste to accumulate inside the separator tank and a paint waste collecting condition in which the water level in the separator tank is raised for the excess water to flow over the weir into the collector container. The water level adjusting mechanism includes an overflowing water tank communicating with a lower portion of the separator tank for regulating by means of the overflowing water the water level at the separator tank to be a predetermined low water level for providing the paint waste accumulating condition and a water level raising device for increasing an amount of water entering the separator tank relative to an amount of the overflowing water from the overflowing water tank so as to raise the water level at the separator tank from the predetermined low water level for providing the paint waste collecting condition.

4 Claims, 3 Drawing Sheets

PAINT WASTE SEPARATOR-COLLECTOR APPARATUS

BACKGROUND OF THE INVENTION

1. Field of the Invention

The present invention relates to an apparatus for collecting and eliminating paint mist contained in exhaust gas generated from a painting installment or for separating and collecting paint waste from water used for cleaning and eliminating paint adhered to floors or walls at a painting booth, and more particularly to a paint waste separator-collector apparatus comprising a separator tank for receiving water containing paint waste and causing the waste to float up to the surface, a weir for permitting the paint waste along with overflowing water from the separator tank into a collector container and a water level adjusting mechanism for switchably providing a paint waste accumulating condition in which a water level in the separator tank is lowered for the water not to flow over the weir thereby causing the floating paint waste to accumulate inside the separator tank and a paint waste collecting condition in which the water level in the separator tank is raised for the excess water to flow over the weir into the collector container.

2. Description of the Prior Art

In the case of a conventional apparatus of the above-described type, if the water level in the separator tank is too lowered in the paint waste accumulating condition, the water level need be raised considerably when the paint waste collecting condition is needed, whereby the paint waste collecting efficiency is deteriorated. On the contrary, if the tank water level in the paint waste accumulating condition is too close to the overflowing level of the weir, there occurs inadvertent overflowing of the water, whereby the waste collecting efficiency is deteriorated or the paint waste is unintentionally overflown before the collector container is replaced.

Therefore, it becomes important to maintain accurately and stably the water level in the separator tank to be lower by a proper distance than the overflowing level of the weir. For this purpose, there is disclosed, for example, in a Japanese patent application published under U.S. Pat. No. 4,100,066 water level adjusting means adapted for finely adjusting the water level by controllably varying air pressure inside a closed type separator tank.

However, with the above method, a complicated construction is necessary for the fine adjustment of the air pressure and further the construction of the separator tank needed for the pressure adjustment also tends to be complicated. As the result, there occur such problems as increase in the costs of the installment or increase in the troubles due to the complexity of the apparatus. Therefore, there has been room for improvement in the reliability of the apparatus.

SUMMARY OF THE INVENTION

Taking the above state of the art into consideration, it is the object of the present invention to simplify the construction of the apparatus of the above-described type by employing a reasonable water level regulating means thereby maintaining accurately and stably the water level in the separator tank at a proper level in the paint waste accumulating condition.

For accomplishing the above object, a paint waste separator-collector apparatus related to the present invention is characterized by a water level adjusting mechanism for switchably providing a paint waste accumulating condition in which a water level in the separator tank is lowered for the water not to flow over the weir thereby causing the floating paint waste to accumulate inside the separator tank and a paint waste collecting condition in which the water level in the separator tank is raised for permiting the excess water to flow over the weir into the collector container, the water level adjusting mechanism including an overflowing water tank communicating with a lower portion of the separator tank for regulating the water level to be a predetermined low water level for providing the paint waste accumulating condition and a water level raising means for raising the water level from the predetermined low water levIl to provide the paint waste collecting condition by increasing an amount of water flowing into the separator tank relative to the amount of the overflowing water from the overflowing water tank.

Functions and effects of the paint waste separator-collector apparatus related to the present invention will be described next.

According to the apparatus of the present invention, the water level at the separator tank is regulated to be the predetermined low water level in the paint waste accumulating condition by controlling the overflowing water level of the overflowing water tank communicating with the separator tank to be the predetermined low water level by causing paint waste containing water entering the separator tank to overflow from the overflowing water tank. Therefore, the water level at the separator tank in the paint waste accumulating condition may be automatically, accurately and stably maintained at the desired low level without carrying out the fine water level adjustment which has been needed in the prior art.

Furthermore, since the water level at the separator tank may be maintained at the low level in the paint waste accumulating condition, the paint waste accumulating conditon and the paint waste collecting condition may be readily switched over merely by providing the water level raising means having the simple water level adjusting function for raising the water level at the separator tank from the predetermined low level by increasing the amount of water flowing into the separator tank relative to the amount of water overflowing from the overflowing water tank.

It is to be noted here that there is no possibility of floating paint waste at the separator tank disadvantageously entering the overflowing water tank since the same communicates with a lower portion of the separator tank.

As described above, the paint waste separator-collector apparatus related to the present invention is capable of improving the waste collecting efficiency into the collector container, which is one of the objects of the present invention, by properly maintaining the water level in the separator tank at the predetermined low level in the paint waste accumulating condition. Also, it is possible to prevent such a trouble as the inadvertent outflow of paint waste when the collector container is not yet set. Furthermore, since the apparatus has a simple construction comprising the overflowing water tank communicating with the separator tank and the water level raising means for carrying out the simple water level adjustment, there hardly occur construction troubles. And, it is easy to cope with such troubles if they should occur. In conclusion, the present invention has achieved a highly reliable paint waste separator-collector apparatus.

Other features and advantages of the paint waste separator-collector apparatus related to the present invention will become more apparent by referring to the following description of the preferred embodiments with reference to the accompanying drawings.

DETAILED DESCRIPTION OF THE PREFERRED EMBODIMENTS

Preferred embodiments of the present invention will be particularly described hereinafter with reference to the accompanying drawings.

Figure 1:
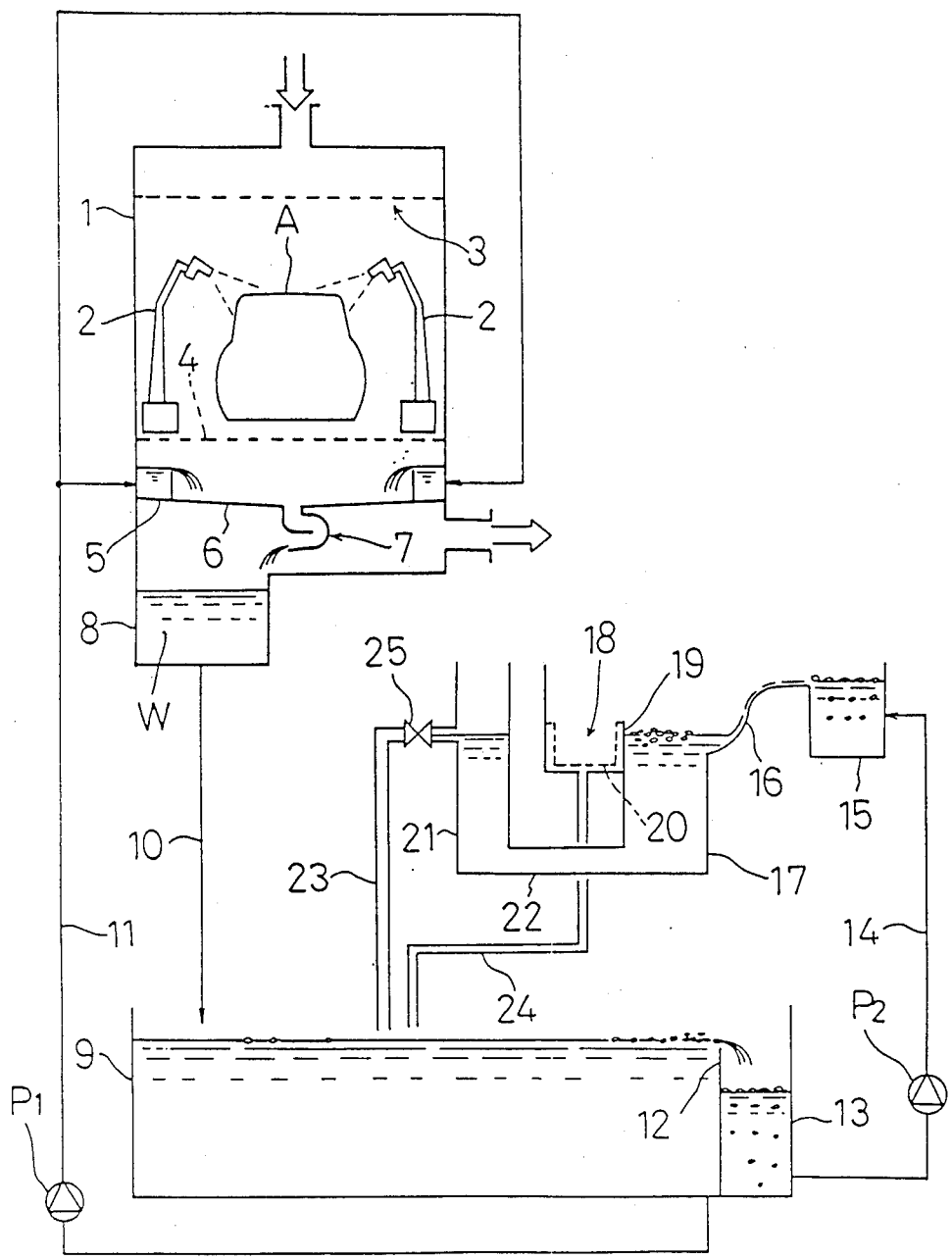
FIG. 1 is a system diagram illustrating a preferred embodiment of a paint waste separator-collector apparatus related to the present invention.

Referring to FIG. 1, a reference numeral 1 denotes a painting booth, in which there are provided painting robots 2 at both sides of a transport passage of an object to be painted 'A'. Ventilating air is blown in the form of downardly-directed laminar air flow out of a ceiling air outlet 3 and the air inside the booth is forcibly exhausted via a grating floor 4 thereby exhausting excess spray paint mist along with the air to the outside.

Below the grating floor 4, there is provided a pan 6 for causing water overflowing from a tub 5 to flow down, whereby the pan 6 receives paint solids fallen through the grating floor 4 and the paint solids are washed away by means of flowing-down cleaning water 'W'.

In the air forcible exhaust passage, there is provided a curved constricted flow passage 7 for permiting the exhaust air along with the cleaning water 'W' flown down from the pan 6 to pass at a high velocity, whereby the cleaning water 'W' catches and eliminates the paint mist contained in the exhaust air in the course of their high velocity passage.

The cleaning water 'W' now containing the paint mist and the paint solids having flown down with the cleaning water 'W' from the pan 6 are received by a reservoir tank 8 provided downwardly of the pan 6.

On the other hand, there is provided as an attachment for the booth 1 a circulating tank 9 for receiving the cleaning water 'W' of the reservoir tank 8 as well as the paint waste contained therein via a water passage 10 by means of natural flowing-down of the water. In this circulating tank 9, the contained paint waste is separated to float from the cleaning water 'W' and at the same time the treated cleaning water 'W' is fed back to the tub 5 through a circulating passage 11 including a first pump P1, whereby the cleaning water 'W' is recycled.

At an end portion of weir wall of the circulating tank 9, there is provided a collector weir 12 for causing the floating paint waste along with the overflowing water to flow out of the circulating tank 9. The floating paint waste at the circulating tank 9 is accumulated against the collector weir 12 with the flow of the overflowing water and then the waste is caused to flow over the collector weir 12 into a collector tank 13 together with a small amount of overflowing water.

Thereafter, the paint waste collected at the collector tank 13 is mixed in a stirring motion with the overflowing water 'W' by a second pump P2 and is lifted via a water lifting passage 14 into a relay tank 15. Then, the turbid water containing the paint waste is caused to flow continuously via a flow-down passage 16 into a separator tank 17.

At this separator tank 17, there is a paint waste catching weir 17 for causing the floating paint waste floated and separated at the tank 17 together with the overflowing water to flow into an adjacently disposed collector tank 18. This collector tank 18 accommodates therein a mesh type collector container 20 for catching and separating the paint waste in the overflowing water from the paint waste catching weir 17.

An overflowing water tank 21 for regulating a water level at the separator tank 17 is communicatably connected with a lower portion of the separator tank 17 via a communicating passage 22, whereby the water overflowing from the overflowing water tank 21 in association with the inflow of the paint waste laden turbid water into the separator tank 17 is recycled into the circulating tank 9 via an overflowing water passage 23.

The recycled overflowing water having passed the collector container 20 at the collector tank 18 is caused to be fed back into the circulating tank 9 via the flow-down passage 24.

In case the cleaning water 'W' flowing down via the water passage 10 from the booth 1 and the cleaning waters 'W' respectively recycled via the overflowing water passage 23 and a flow-down circulating passage 24 from the overflowing water tank 21 and from the collector tank 18 are circulated back into the circulating tank 9, there are provided outlets respectively for the water passage 10, the overflowing water passage 23 and for the flow-down circulating passage 24 such that the inflow of the cleaning waters 'W' may generate a surface flow directed towards the collector weir 12 throughout the surface of water at the circulating tank. As the result, the surface flow prevents the floating paint waste to remain at the circulating tank 9 thereby causing the waste to be efficiently accumulated at the collector tank 13.

As for the flow of the paint waste laden turbid water into the separator tank 17 also, the flow-down passage 16 is arranged such that the turbid water flowing down from the relay tank 15 may be directed towards the paint waste collector weir 19 and at the same time may flow into the separator tank 17 substantially horizontally along the surface of water at the separator tank. Further, by controllably varying the flow-down velocity of the turbid water thereby to impel the accumulated paint waste at the separator tank 17 by means of the inflow of the turbid water, the paint waste may be caused to flow smoothly over the paint waste collector weir 19 into the collector container 20.

At the separator tank 17, the paint waste is collected by switching over the water level between a paint waste accumulating condition and a paint waste collecting condition. In the former condition, the water level is lowered to stop the overflow of the water at the paint waste collector weir 19 thereby causing the waste to be accumulated inside the separator tank 17. In the latter condition, the water level is raised to cause the overflow at the paint waste collector weir 19 thereby causing the accumulated floating paint waste to flow into the collector container 20. By switchably providing these conditions, it is possible to transfer a desired amount of paint waste at one time, after the floating waste has been accumulated up to that amount, into the collector container 20, whereby the paint waste may be efficiently collected at the collector container 20 which size is limited for facilitating the handling thereof.

After a certain amount of paint waste has been accumulatedly collected at the collector container 20, the container 20 is replaced by a new container 20 in the course of the next paint waste accumulating condition. The collected paint waste will be appropriately treated, e.g. by being burnt.

The above-described two water level conditions at the separator tank 17 are actually provided by a water level regulating operation by the overflowing water tank 21 and by a water level raising operation by water level raising means. The overflowing level of the overflowing water tank 21 is adapted to correspond to a predetermined low water level at the separator tank 17 for providing the paint waste accumulating condition.

More specifically, for providing the paint waste accumulating condition, the water level at the separator tank 17 is controllably maintained at the predetermined low water level by means of the overflow of the water from the overflowing water tank 21 associated with the inflow of the paint waste laden turbid water into the separator tank 17.

On the other hand, for providing the paint waste collecting condition, the overflowing water passage 23 incorporates as the water level raising means a control valve 25 (an example of a water control device) for regulating the amount of the overflowing water from the overflowing water tank 21 (including a total blockage of the overflowing water passage). By controlling the amount of the overflowing water by means of the control valve 25, the inflow amount of the turbid water into the separator tank 17 (the amount is substantially constant) is increased relative to the amount of the overflowing water from the overflowing water tank 21, whereby the water level at the separator tank 17 is raised from the aforementioned predetermined low level to provide the paint waste collecting condition.

Also, for corresponding the overflowing level of the overflowing water tank 21 to the predetermined low water level at the separator tank 17, considering the difference between the water level at the separator tank related to a passage resistance of the communicating passage 22 and the water level at the overflowing water tank, the overflowing level of the overflowing water tank 21 is set to be lower than the predetermined lower water level at the separator tank 17 by said water level difference.

The predetermined low water level is conveniently set such that inadvertent overflow may not occur at the paint waste collector weir 19 in the paint waste accumulating condition and the water level need not be raised to inconveniently large degree to reach the paint waste collecting condition, and also the level is set depending on a desired accumulation amount of the floating paint waste.

For providing the paint waste collecting condition, how much amount of the overflowing water is to be limited by the control valve 25 should be conveniently determined so as to minimize the amount of the overflow at the paint waste collector weir 19 as long as the minimized overflow does not prevent the smooth flow of the accumulated floating paint waste into the collector container 20.

For returning to the paint waste accumulating condition from the paint waste collecting condition, the control valve 25 is released from its overflow limiting state.

Alternate embodiments of the present invention will be described hereinafter.

Figure 2:
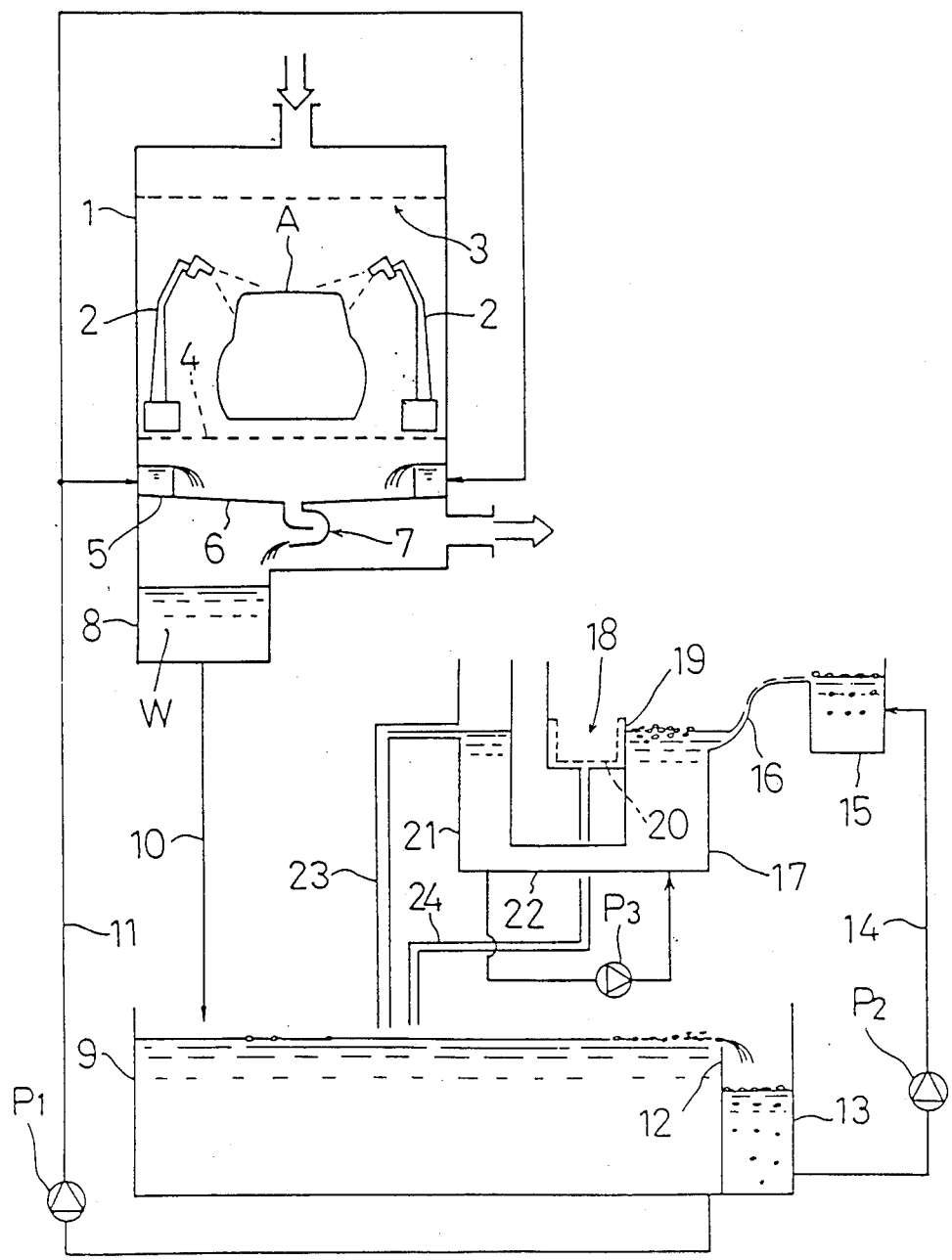
FIGS. 2 and 3 are system diagrams illustrating alternate preferred embodiments of the present invention.

Referring now to FIG. 2, as the water level raising means, there is now provided a pump P3 for forcibly recycling the water deposited at the overflowing water tank 21 to the separator tank 17. In operation, this pump P3 increases the amount of the water flowing into the separator tank 17 relative to the amount of the overflowing water from the overflowing water tank 21 thereby to raise the water level at the separator tank 17.

Figure 3:
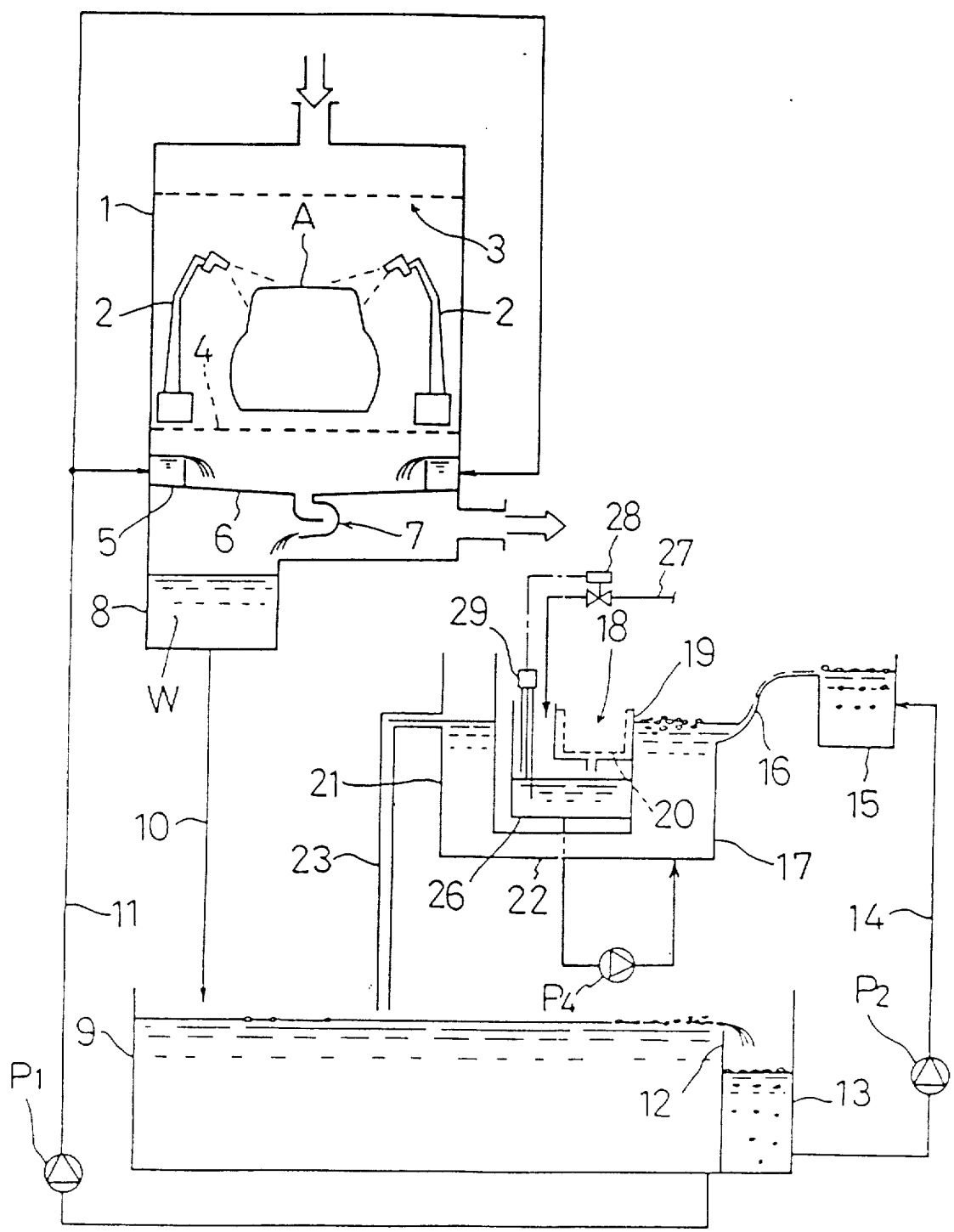

Referring now to FIG. 3, there is provided at the collector tank 18 a tub 26 for depositing the recycled overflowing water having passed the collector container 20 and there is also provided a pump P4 for forcibly returning the recycled overflowing water deposited at at the tub 26 into the separator tank 17. In operation, this pump P4 increases the amount of water flowing into the separator tank 17 relative to the amount of overflowing water from the overflowing water tank 21 thereby raising the water level at the separator tank 17.

In FIG. 3, a reference numeral 27 denotes a water supply passage, a numeral 28 denotes an electromagnetic valve and a reference numeral 29 denotes an electrode for detecting the level of the deposited recycled overflowing water. In operation, if there is shortage in the amount of overflowing water to be recycled to the separator tank 17, additional water is automatically supplied through the electromagnetic valve 28 based on the water level detection by the electrode 29.

In the case of the above systems shown in FIG. 2 and FIG. 3, since the water level at the separator tank 17 is raised by utilizing the passage resistance at the communicating passage 22, the amount of water supplied by the pumps P3, P4 is determined considering a sectional area of the communicating passage 22 and a necessary degreee of water level increase.

In the water level raising means, there are various alternatives in the specific water level adjusting construction for increasing the amount of water flowing into the separator tank 7 relative to the amount of overflowing water from the overflowing water tank 21.

In the above description, it is to be noted here, the treating liquid is represented by water. However, the treating liquid may comprise any of various kinds of water solutions or of other kinds of liquids.

What is claimed is:

1. A paint waste separator-collector apparatus, comprising:
   a separator tank for receiving water containing paint waste and for causing the contained paint waste to separate and float;
   a weir for causing the floating paint waste together with overflowing water from said separator tank into a collector container; and
   a water level adjusting mechanism for switchably providing a paint waste accumulating condition in which a water level in said separator tank is lowered for the water not to flow over said weir thereby causing the floating paint waste to accumulate inside said separator tank and a paint waste collecting condition in which the water level in said separator tank is raised for the excess water to flow over said weir into said collector container; wherein said water level adjusting mechanism includes;

an overflowing water tank communicating with a lower portion of said separator tank for regulating by means of the overflowing water the water level at said separator tank to be a predetermined low water level for providing said paint waste accumulating condition, a mesh type collector container for catching and separating the paint waste from the overflowing water, and water level raising means for increasing an amount of water entering said separator tank relative to an amount of the overflowing water from said overflowing water tank so as to raise the water level at said separator tank from said predetermined low water level for providing said paint waste collecting condition.

2. A paint waste separator-collector apparatus, as defined in claim 1, wherein said water level raising means is a water control device for controlling the amount of overflowing water from said overflowing water tank.

3. A paint waste separator-collector apparatus, as defined in claim 1, wherein said water level raising means is a pump for forcibly recycling the water deposited at said overflowing water tank into said separator tank.

4. A paint waste separator-collector apparatus, as defined in claim 1, wherein said water level raising means is a pump for forcibly returning water separated in said collection container during said paint waste collecting condition to said separator tank.

* * * * *

UNITED STATES PATENT AND TRADEMARK OFFICE
CERTIFICATE OF CORRECTION

PATENT NO. : 4,783,257

DATED : November 8, 1988

INVENTOR(S) : Koji Morioka and Makoto Watanabe

It is certified that error appears in the above-identified patent and that said Letters Patent is hereby corrected as shown below:

Insert FIG. 3 as shown on the attached sheet.

Column 2 Line 16 "levIl" should read --level--.

Column 3 Line 27 "downardly" should read --downwardly--.

Column 5 Line 56 before "inconveniently" insert --an--.

Column 6 Line 18 after "deposited" delete --at-- (first occurrence).

Signed and Sealed this

Seventeenth Day of October, 1989

Attest:

DONALD J. QUIGG

Attesting Officer

Commissioner of Patents and Trademarks